US009074483B2

United States Patent
Breeze-Stringfellow et al.

(10) Patent No.: US 9,074,483 B2
(45) Date of Patent: Jul. 7, 2015

(54) HIGH CAMBER STATOR VANE (75) Inventors: Andrew Breeze-Stringfellow, Cincinnati, OH (US); David Scott Clark, Liberty Township, OH (US); Brent F. Beacher, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 584 days.

(21) Appl. No.: 13/072,091

(22) Filed: Mar. 25, 2011

(65) Prior Publication Data

US 2012/0243983 A1    Sep. 27, 2012

(51) Int. Cl.
*F01D 9/00* (2006.01)
*F01D 5/14* (2006.01)
*F04D 29/54* (2006.01)

(52) U.S. Cl.
CPC ............... *F01D 5/148* (2013.01); *F01D 5/141* (2013.01); *F05D 2240/121* (2013.01); *F05D 2240/303* (2013.01); *Y02T 50/673* (2013.01); *F05D 2250/71* (2013.01); *F04D 29/544* (2013.01)

(58) Field of Classification Search
CPC ............ F01D 5/14; F01D 5/00; F01D 5/141; F01D 5/145; F01D 5/148; F01D 1/10; F01D 1/00; F01D 9/00; F04D 29/54; F04D 29/544; F05D 2240/121; F05D 2240/122
USPC ............... 416/223 R, 223 A, DIG. 2, DIG. 5; 415/191
See application file for complete search history.

(56) References Cited

U.S. PATENT DOCUMENTS

| | | | |
|---|---|---|---|
| 4,826,400 A * | 5/1989 | Gregory | 415/181 |
| 5,167,489 A | 12/1992 | Wadia et al. | |
| 6,312,219 B1 | 11/2001 | Wood et al. | |
| 6,508,630 B2 | 1/2003 | Liu et al. | |
| 7,390,165 B2 | 6/2008 | Francini | |
| 2008/0131271 A1 | 6/2008 | Wood et al. | |
| 2008/0131272 A1 | 6/2008 | Wood et al. | |
| 2008/0152505 A1* | 6/2008 | Burton et al. | 416/223 R |
| 2010/0260609 A1 | 10/2010 | Wood et al. | |

FOREIGN PATENT DOCUMENTS

| | | |
|---|---|---|
| CN | 1769647 A | 5/2006 |
| CN | 101603436 A | 12/2009 |
| EP | 0441097 A1 | 6/1991 |

(Continued)

OTHER PUBLICATIONS

Leroy H. Smith, Jr. et al., "Sweep and Dihedral Effects in Axial-Flow Turbomachinery", Transaction of the ASME, Sep. 1963.

(Continued)

*Primary Examiner* — Edward Look
*Assistant Examiner* — Juan G Flores
(74) *Attorney, Agent, or Firm* — General Electric Company; William Scott Andes (57) ABSTRACT

A stator vane for a compressor is described. The stator vane has an airfoil root, an airfoil tip, a leading edge, a trailing edge, an inner span region, a midspan region and an outer span region, wherein the stator vane has a normalized camber profile that increases in the outer span region in a spanwise direction towards the tip and is more than 1.4 in the outer span region.

16 Claims, 8 Drawing Sheets

(56) References Cited

FOREIGN PATENT DOCUMENTS

| EP | 1098092 | A2 | 5/2001 |
|---|---|---|---|
| EP | 2133573 | A1 | 12/2009 |

OTHER PUBLICATIONS

Wang, Songtao et al: Study on the effects of end-bend cantilevered stator in a 2-stage axial compressor:, Journal of Thermal Science, vol. 18, No. 2, Jun. 1, 2009, pp. 119-125.

Chen, Shaowen et al: "Aerodynamic performance of bowed compressor cascades with different camber angles", Frontiers of Engery and Power Engineering in China, vol. 2, No. 3, Sep. 1, 2008, pp. 306-312.

Gallimore, Simon J. et al: "The Use of Sweep and Dihedral in Multistage Axial Flow Compressor Blading—Part I: University Research and Methods Development", Journal of Turbomachinery, vol. 124, No. 4, Jan. 1, 2002, p. 521.

PCT Search Report and Written Opinion dated Jul. 2, 2012 from corresponding Application No. PCT/US2012/030070.

Unofficial English translation of Office Action issued in connection with corresponding CN Application No. 201280015078.X on Oct. 10, 2014.

* cited by examiner

HIGH CAMBER STATOR VANE

BACKGROUND OF THE INVENTION

This invention relates generally to jet propulsion engines, and more specifically to compressor stator vane airfoils used therein.

In a gas turbine engine air is pressurized in a compressor and mixed with fuel in a combustor for generating hot combustion gases. The combustion gases are discharged through turbine stages which extract energy therefrom for powering the compressor, and producing output power for use in driving a booster (low pressure compressor) and a fan in an exemplary turbofan aircraft engine application.

A multistage axial compressor includes cooperating rows of stator vanes and rotor blades which decrease in size to pressurize air in stages. The compressor vanes and blades have corresponding airfoils which typically vary in configuration as their size decreases from stage to stage for maximizing performance of the compressor. Compressor performance includes, for example, efficiency of compression, flow capability, and stall margin, which are all affected by the aerodynamic configuration of the airfoils of the vanes and blades, as well as by the outer and inner flowpath boundaries on the stator vanes.

More specifically, the flow or pressure distribution of the air as it is being compressed through the stator vanes and rotor blades is a complex three dimensional flow field varying circumferentially around the compressor, radially along the span of the vane and blade airfoils, and axially along the circumferentially opposite pressure and suction sides of the airfoils. Actual flow of the air being compressed through the stages is not uniform over the radial span of the blades and vanes since the outer and inner flowpaths provide substantial interaction with the axially moving airflow. The stator vanes must efficiently diffuse the flow and deliver it with proper velocities to the downstream rotors. Flow in the end wall region is complex where boundary layers on the vane and flowpath surfaces come together. Good stator designs must be compatible with the requirements of the rotors, without producing flow separations that would limit the operating range of the compressor.

Axial and mixed flow compressor blades that are designed to compress the air usually have a rotor or number of rotors that rotate inside a stationary casing and act to raise the total pressure and temperature of the flow passing through the machine. The compressor rotor blades carry a lift on the body of the airfoil that manifests itself as a higher static pressure on the pressure surface of the airfoil and a lower static pressure on the suction surface of the airfoil. Generally a small gap exists between the tip of the compressor rotor and the radially adjacent casing flowpath. The pressure difference between pressure side and suction side of the airfoil drives flow through the tip gap of the compressor rotor. This tip flow can roll up into a vortex, which tends to collect on the pressure side surface of the circumferentially adjacent blade, leading to high levels of loss and blockage in the compressor tip region. As this blockage spreads across the compressor rotor tip, the ability of the compressor to produce a pressure rise decreases, and may result in a stall in some cases. This problem is exacerbated by weak flow near the endwalls (such as the outer and inner flowpath boundaries on the stator vanes) caused by cumulative effects of skin friction and secondary flows. Weak flow near the endwalls allows the aforementioned vortices to remain in the rotor tip region, rather than being convected downstream.

In the art, in conventional designs, it is generally accepted that pressure and velocity profiles will be somewhat weak in the endwall regions (such as the outer and inner flowpath boundaries on the stator vanes) due to the aforementioned loss mechanisms. Stator vanes are generally bowed in the span-wise direction, with moderate increases in camber near the end walls that conventionally do not exceed 1.4 times the minimum value.

Accordingly, it would be desirable to have a compressor stator vane having specific features that improve stator operation with rotors that are designed to strengthen the flow in the end wall regions and can reduce weak flow near endwalls in the compressor. It is desirable to have a compressor stator vane having an airfoil that can strengthen endwall flow speed and pressure to facilitate reduction of tip blockage in the rotor and thereby increase throttle margin.

BRIEF DESCRIPTION OF THE INVENTION

The above-mentioned need or needs may be met by exemplary embodiments disclosed herein which provide a stator vane for a compressor having an airfoil root, an airfoil tip, a leading edge, a trailing edge, an inner span region, a midspan region and an outer span region, wherein the stator vane has a normalized camber profile that increases in the outer span region in a spanwise direction towards the tip and is more than 1.4 in the outer span region. In another embodiment, the normalized camber in the inner span region is more than 1.4. In another embodiment, the stator vane comprises a leading edge having a dihedral profile such that the leading edge has dihedral angles between about −20 and about +25 degrees in the midspan region.

BRIEF DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
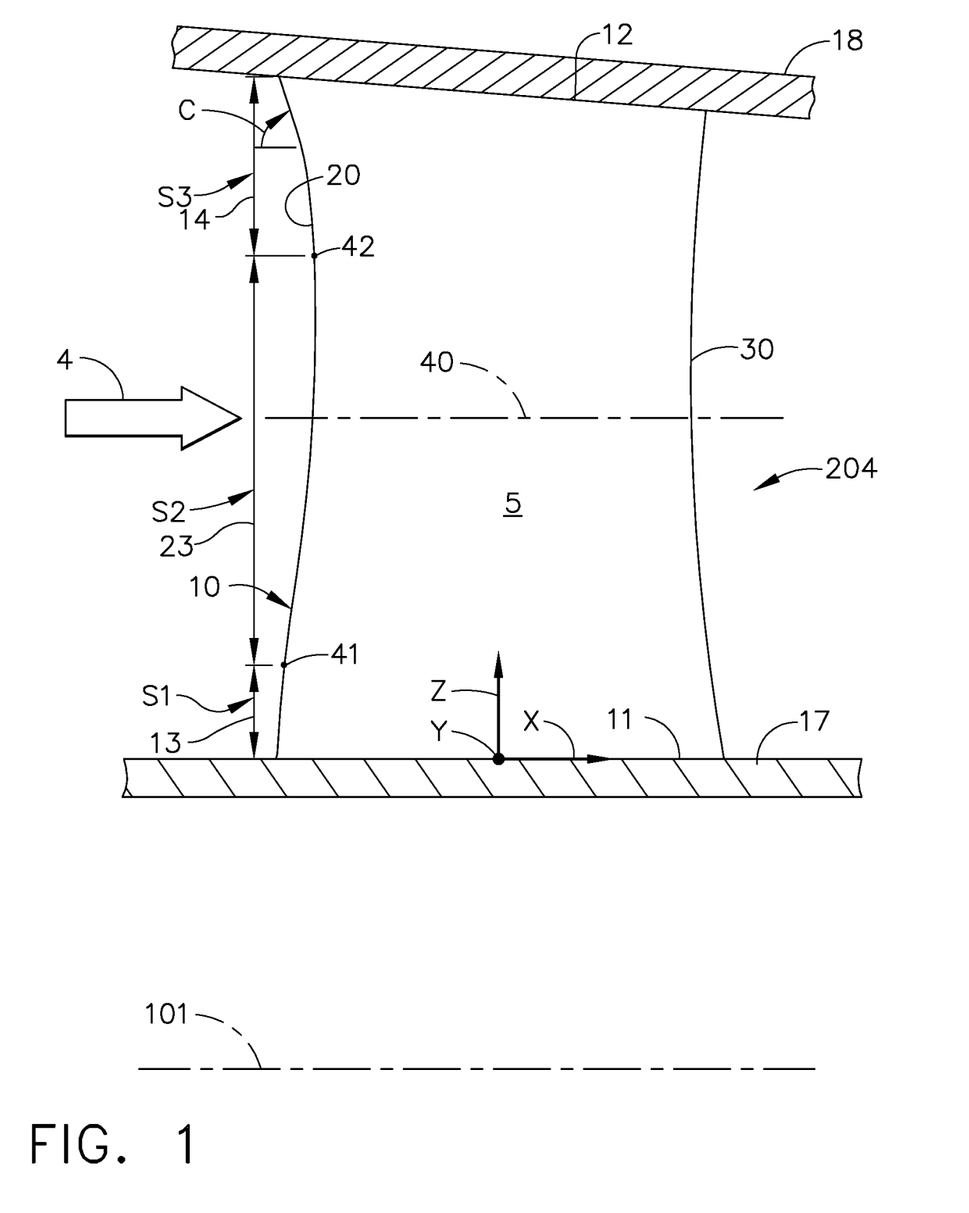
FIG. 1 is a partly sectional side view of a row of compressor stator vanes in a multistage axial compressor constructed according to an aspect of the present invention.
Figure 8:
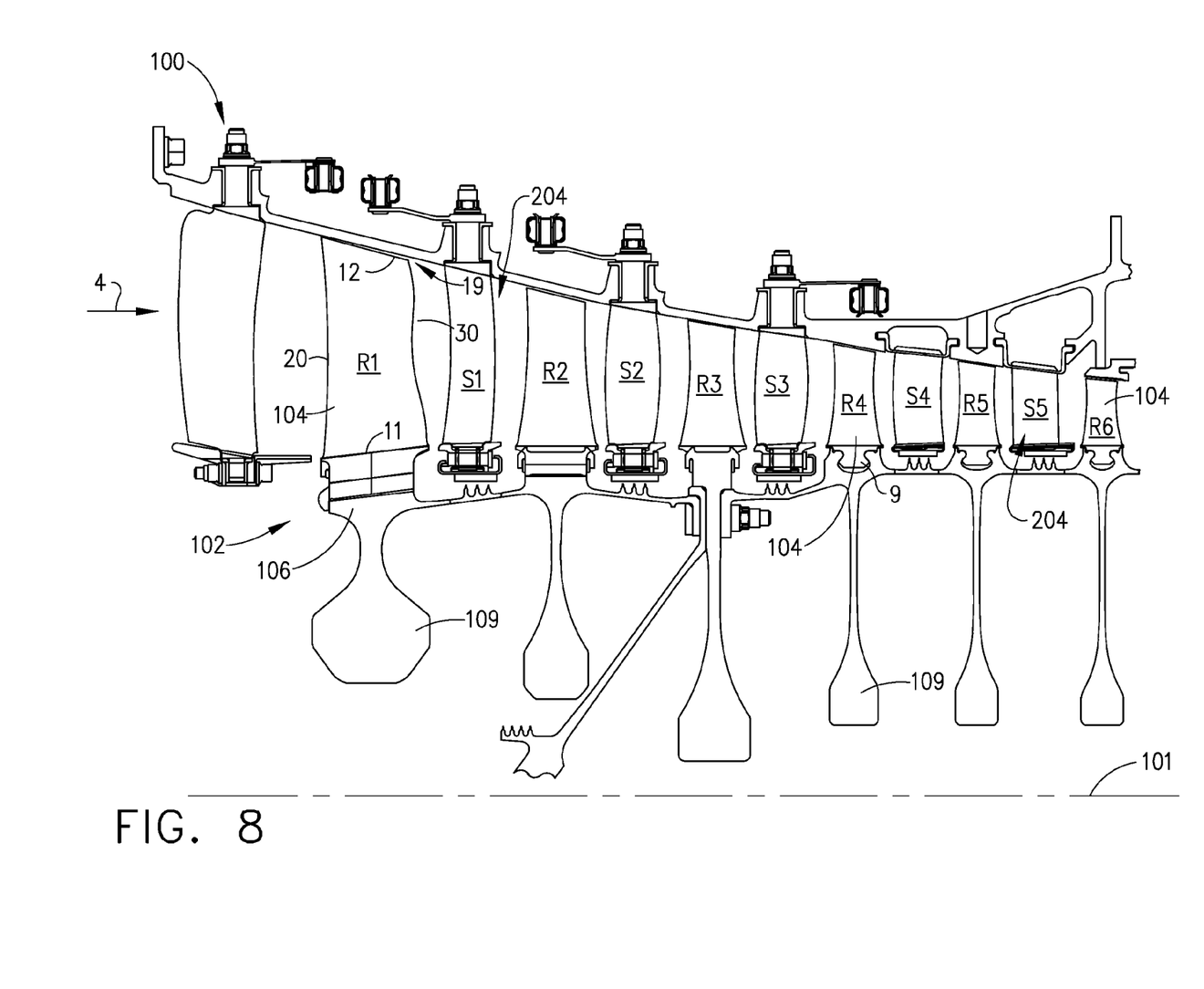
FIG. 8 is a schematic cross-sectional view of a multi-stage compressor having a row of compressor stator vanes according an exemplary embodiment of the present invention.

Referring to the drawings wherein identical reference numerals denote the same elements throughout the various views, FIG. 1 is a schematic cross-sectional view of a portion a partly sectional side view of a row of compressor stator vanes in a multistage axial compressor constructed according to an aspect of the present invention. FIG. 8 is a schematic cross-sectional view of a multi-stage compressor 100 having a row of compressor stator vanes 204 having airfoils 10 according an exemplary embodiment of the present invention, as described herein below.

Illustrated and shown in part in FIG. 8 is a row of compressor rotor stages 102 comprising compressor blades 104 suitably mounted to a compressor rotor 106 of a multistage axial compressor 100 in a gas turbine engine. The compressor 100 has several stages of stator vanes (shown as S1, S2, etc.) cooperating with corresponding compressor rotor blades (shown as R1, R2, etc.) which decrease in size in the downstream (axial) direction as air 4 is compressed during operation. The rotor 106 is axisymmetrical around the axial centerline axis 101 of the engine and supports a full row of the blades 104 within an annular outer casing 18. A small gap 19 exists between the tip 12 of the compressor rotor blade 104 and the radially adjacent casing 18. The rotor 106 further comprises one of more disks 109 that support the blades.

The exemplary compressor 100 FIG. 8 includes a stationary compressor stator 204 including an annular outer casing 18 supporting a row of stator airfoils 10 (alternatively referred to herein as vanes) extending radially inwardly therefrom. The vanes 10 are specifically configured in aerodynamic profile to direct the airflow 4 downstream through cooperating compressor rotor blades 104 extending radially outwardly from a supporting rotor disk driven by a high pressure turbine (not shown).

Figure 2:
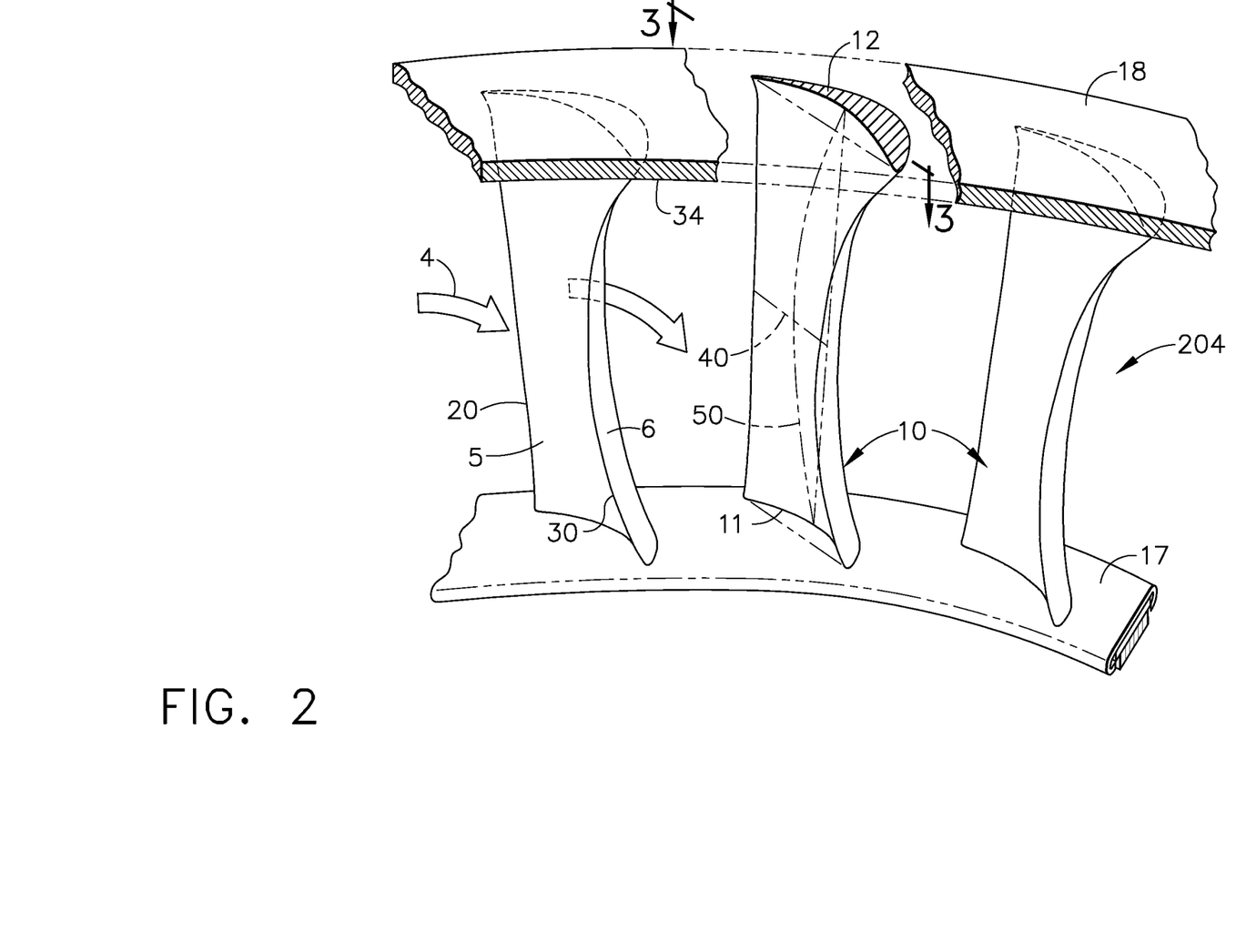
FIG. 2 is a partly sectional isometric view of a portion of the compressor stator illustrated in FIG. 1.

Referring to both FIGS. 1 and 2, the exemplary compressor stator 204 includes a plurality of the stator vanes 10 circumferentially spaced apart from each other and extending radially inwardly from the outer casing 18 which has an inner surface defining the radially outer flowpath 34 for the airflow 4, with the radially inner flowpath being defined in any conventional manner by either by integral inner platform 17 (see FIGS. 1 and 2) or shrouds (not shown) directly attached to the vanes, or a portion of a rotor seal disposed therebelow (not shown).

The stator vanes 10 are identical to each other, with each vane 10 including a pressure or first side 5, 6 and a circumferentially opposite suction or second side 6 extending axially between leading and trailing edges 20, 30 and radially along the span of the vane between a radially inner root 11 and radially outer tip 12. The root 11 is defined at the inner flowpath, and the tip 12 is defined at the outer flowpath. The vane tip 12 is suitably fixedly joined to the outer casing 18 for supporting the entire vane thereto by being integrally cast therewith, or by having an extension brazed inside a complementary aperture through the casing.

Figure 3:
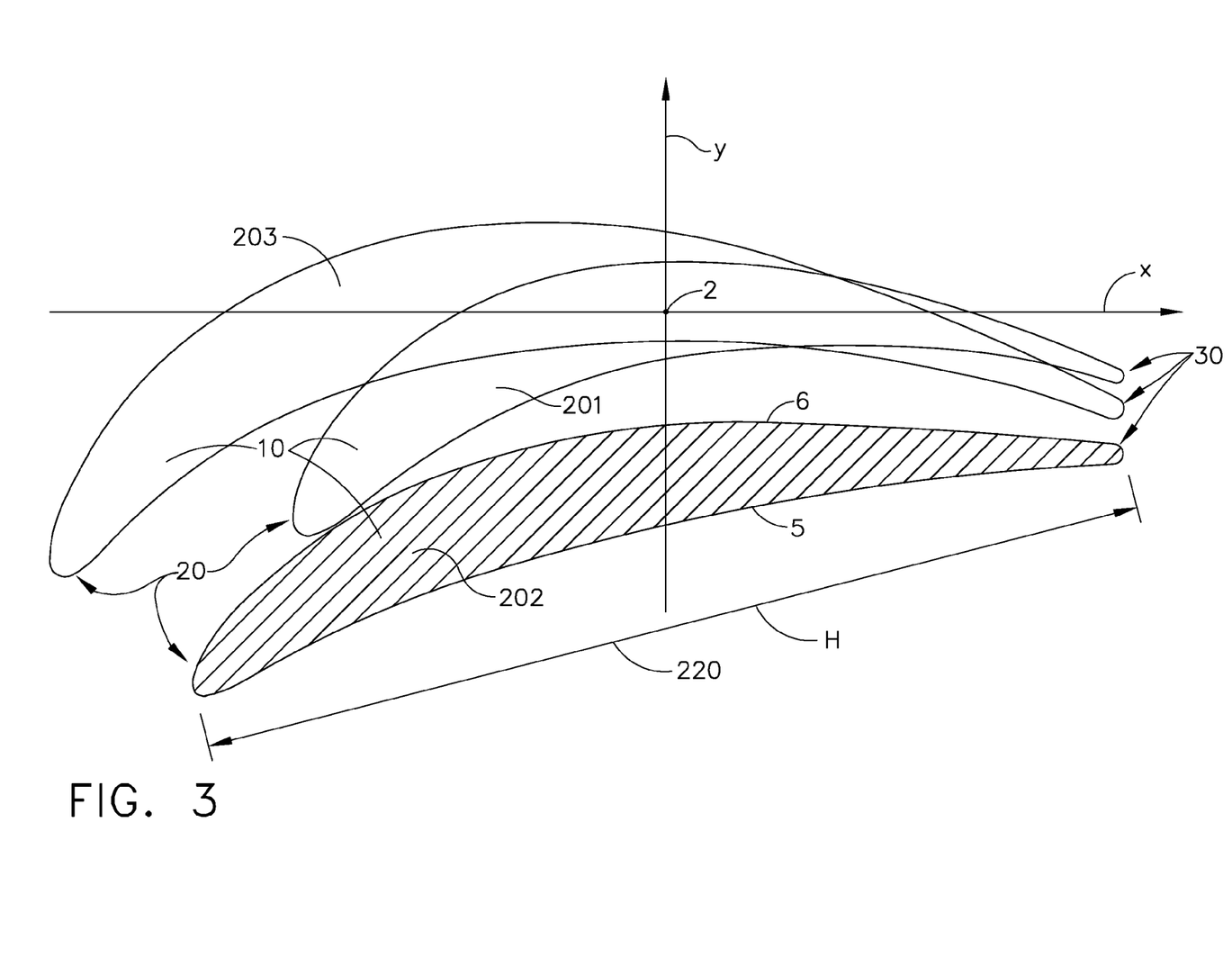
FIG. 3 is a top plan view of airfoil sections taken at root, midspan and tip of an exemplary one of the stator vanes illustrated in FIGS. 1 and 2.

As initially shown in FIGS. 1 and 2, each vane also includes a pitch section 40 disposed radially between the root and tip at the mid-span of the vane 10, with each vane being defined by the aerodynamic profile or contour of each of the radial sections of the vane from the root to the tip (see, for example, items 201, 202, 203 in FIG. 3). A top view of three sections of an exemplary vane 10 is illustrated in more detail in FIG. 3 with the relative geometries of the root 201, pitch section 202, and tip 203 being illustrated. In the exemplary embodiments of the present invention, the camber angles at the root and tip sections 201, 203 are significantly larger than the pitch section 202, as explained further below.

In the exemplary embodiments of the present invention, the aerodynamic profile of the vane 10 is determined for the desired compressor stage, and includes a relatively sharp leading edge 20 increasing in thickness between the pressure and suction sides 5, 6 and then decreasing in thickness to the relatively sharp trailing edge 30. Each radial section of the vane has a straight chord 220 ("H", see FIG. 3) extending from leading to trailing edge, with the chord having a suitable angular orientation relative to the axial centerline axis 101 of the engine for turning the airflow 4 as required for delivery to the downstream compressor blades. The particular angular orientation of each chord is typically known as the twist or stagger angle relative to the axial centerline axis 101 and varies from root 11 to tip 12 as the specific aerodynamic requirements dictate.

Each compressor stator vane (airfoil) 10 extends along a radial axis Z (the direction referred to herein as "span", see FIG. 1) between the outer surface of the inner platform 17 (or other suitable inner flow path structure) and the inner surface of the outer casing 18. The airfoil 10 may be integrally formed with suitable known supporting structures (items 17 and 18 for example) or may be removably joined thereto in a conventional manner.

The compressor stator vane 10 is illustrated in a preferred embodiment in FIGS. 1 and 2 and includes circumferentially or laterally opposite pressure and suction sides 5, 6. The airfoil pressure side 5 precedes the suction side 6 with the circumferential direction, represented by the Y axis (see FIG. 1). The axial axis X is parallel with the compressor (and engine) centerline axis 101 and represents the generally downstream direction of the air 4 as it undergoes compression through the multiple stages of the compressor 100 (see FIG. 8).

The corresponding surfaces of the pressure and suction sides 5, 6 are joined together at axially or chordally opposite leading and trailing edges 20, 30 and extend in the span direction (Z-axis in FIG. 1) from a radially inner root 11 at the junction with the platform to a radially outer tip 12 that is located at a spanwise distance from the root 11 as shown in FIG. 1. As shown in FIG. 8, the rotor compressor blade 104 is disposed closely adjacent to the inner surface of a surrounding casing and defines a radial clearance or gap 19 therebetween.

In one aspect of the present invention, as described in detail below, airfoil 10 has certain geometries for the stator vane having specific camber distributions for the airfoil 10 and specific dihedral features for the leading edge 20 and the resulting geometries near the airfoil tip 12 serve to strengthen endwall flow (i.e., flow near the inner platform 17 and outer casing 18) speed and pressure to facilitate reduction of tip blockage in the following compressor rotor stage and thereby increase throttle margin. The specific features of the stator vane 10 in the various embodiments shown herein, help to pull relatively weaker airflow out of the rotor blade tip region radially inwards near the tip. This weak flow then mixes with the main body of airflow 4, rather than building up in the rotor blade tip region causing inefficiencies and potential stall. The specific features of the airfoil 10 described herein thereby facilitate improvement in the stall margin and extending the throttle range of the compressor 100.

Some of the specific airfoil features as described in detail herein below contribute to the advantages of the present invention. For example, an increased camber at tip 12 contributes to enhancing the rotor inlet velocity of air in the tip region. Further, an aerodynamic sweep in the tip region, (such as, for example, shown as "C" in FIG. 1), may be additionally used to reduce creation of undesirable accumulation of boundary layer flow in the tip region.

Figure 4:
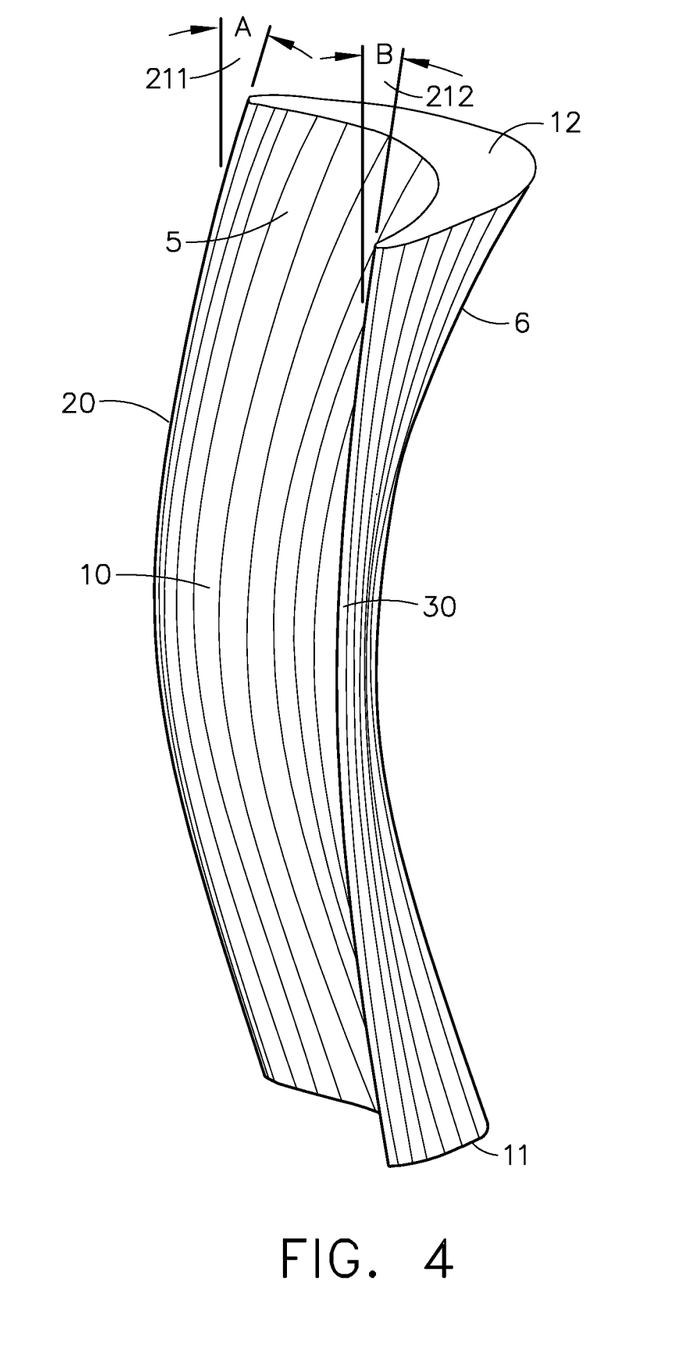
FIG. 4 is an isometric view of the airfoil portion of the compressor stator vane illustrated in FIG. 1.

The terms "Dihedral" (or, alternatively, "dihedral angle") and "sweep" as used herein, are conventional terms used in the design of airfoils (see, for example, Leroy H. Smith, J R. et. al, "Sweep and Dihedral Effects in Axial-Flow Turbomachinery", Transaction of the ASME, September 1963). A dihedral angle, as used herein, is shown as angles "A" 211 (for the leading edge 20) and "B" 212 in FIG. 4 for illustration purposes. The angles A and B, although shown at the leading edge tip 12 of the airfoil 10 for illustration purposes, may exist at other locations on the airfoil. Aerodynamic sweep is a conventional parameter represented by a local sweep angle which is a function of the direction of the incoming air and the orientation of the airfoil surface in both the axial, and circumferential or tangential directions. The sweep angle is defined in detail in the U.S. Pat. No. 5,167,489, and is incorporated herein by reference. In the sign convention commonly used in the art, the aerodynamic sweep angle is represented as a negative value (−) for forward sweep, and a positive value (+) for aft sweep.

FIGS. 1-4 show a compressor stator vane 10 according to one embodiment of the present invention. It has an airfoil 10 having an airfoil root 11, an airfoil tip 12 located at a spanwise distance from the airfoil root 11, a leading edge 20 extending from the airfoil root 11 to the airfoil tip 12, a trailing edge 30 extending from the airfoil root 11 to the airfoil tip 12, airfoil pressure and suction sides 5, 6 extending between the leading edge 20 and the trailing edge 30. As shown in FIG. 1, the airfoil 10 leading edge 20 has a first inner span region 13 (shown as "S1") between the airfoil root 11 and a first height location 41 on the leading edge, a midspan region 23 (shown as "S2") between the first height location 41 and a second height location 42 on the airfoil leading edge 20 located radially (spanwise) outward from the first height location and an outer span region 14 (shown as "S3") between the second height location 42 and the airfoil tip 12. The span (alternatively referred to as span height) extends from the root 11 to the tip 12 of the airfoil 10 in the spanwise direction. The spanwise direction is the direction shown as "Z" axis in FIG. 1. In an exemplary embodiment, the first height location 41 is located at about the 10% span and the second height location 42 is located at about 80% span.

Figure 5:
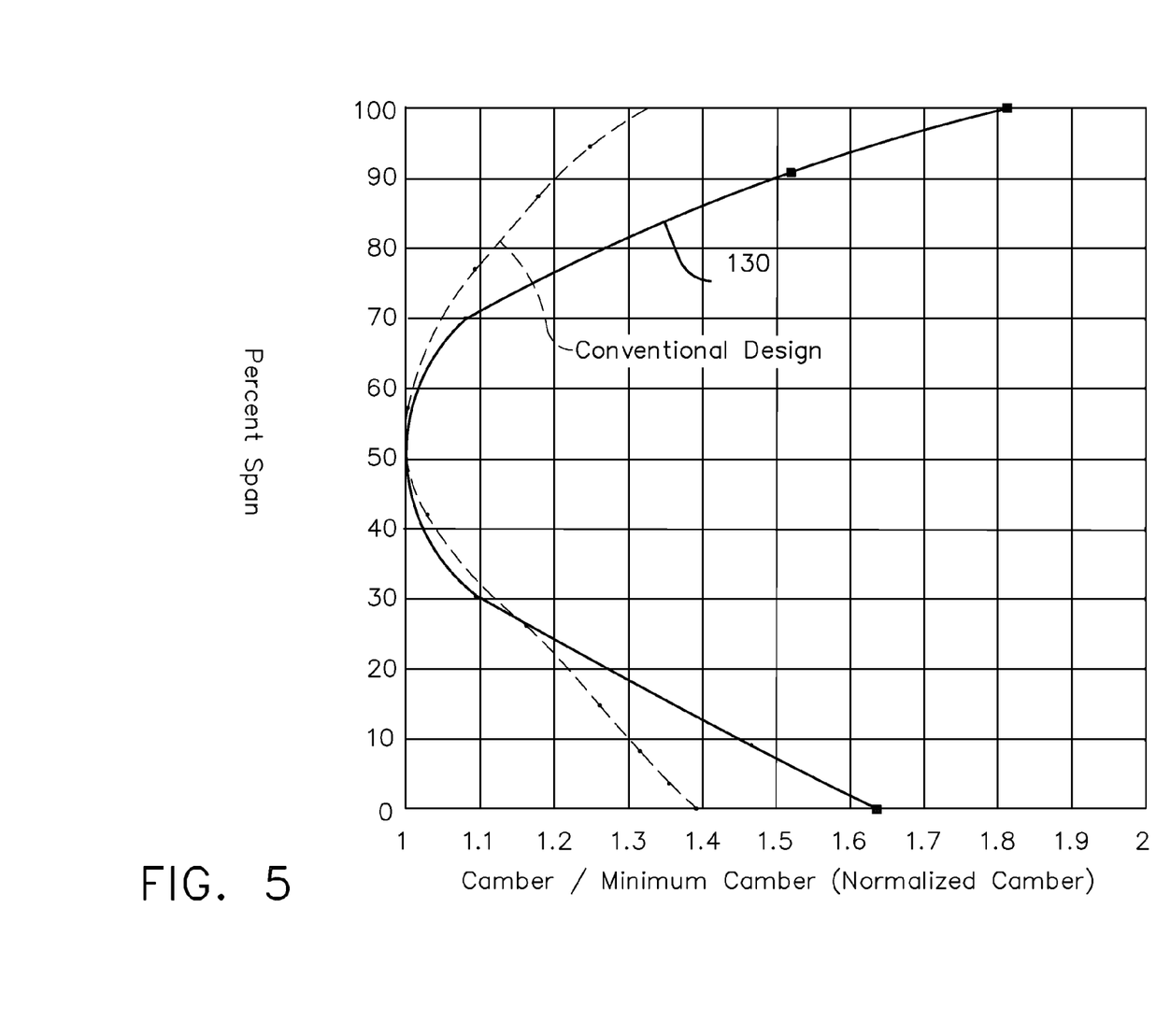
FIG. 5 is a graph plotting airfoil normalized camber over the radial span of the airfoil of the stator vane illustrated in FIG. 1 in an exemplary embodiment.

In one aspect of the present invention, the stator vane 10 has a normalized camber profile 130 (see FIG. 5 for example) such that the normalized camber increases in the outer span region 14 in a spanwise direction towards the tip 12 and is more than 1.4 in the outer span 14 region. In this context, "camber" (or alternatively, "camber angle") of an airfoil or blade as used herein has the conventional meaning known in the art. That is, airfoil camber (or alternatively, "camber angle") is the difference in the metal angles between the leading and trailing edges of the airfoil. As used herein, the term "normalized camber" at a spanwise location is the camber at that particular location divided by the minimum camber. The minimum camber used for normalization may occur, but not necessarily, at the midspan location, such as shown as item 40 in FIG. 1. An exemplary normalized camber profile (i.e., distribution in the spanwise direction) according to an exemplary embodiment of the present invention is shown in FIG. 5. In a preferred embodiment of the present invention, the second height location 42 is located at a span of about 80% from the root and the normalized camber at the airfoil tip is greater than 1.4. See FIG. 5. In another aspect of the present invention, the normalized camber of the stator vane 10 in the inner span region decreases in the inner span region in a spanwise direction from the root. In a preferred embodiment, the first height location 41 is located at a span of about 10% from the root and the normalized camber in the inner span region is at least 1.4. In another embodiment, the stator vane 10 second height location 42 is located at a span of about 80% from the root and the normalized camber at the airfoil increases towards the tip 12.

Figure 6:
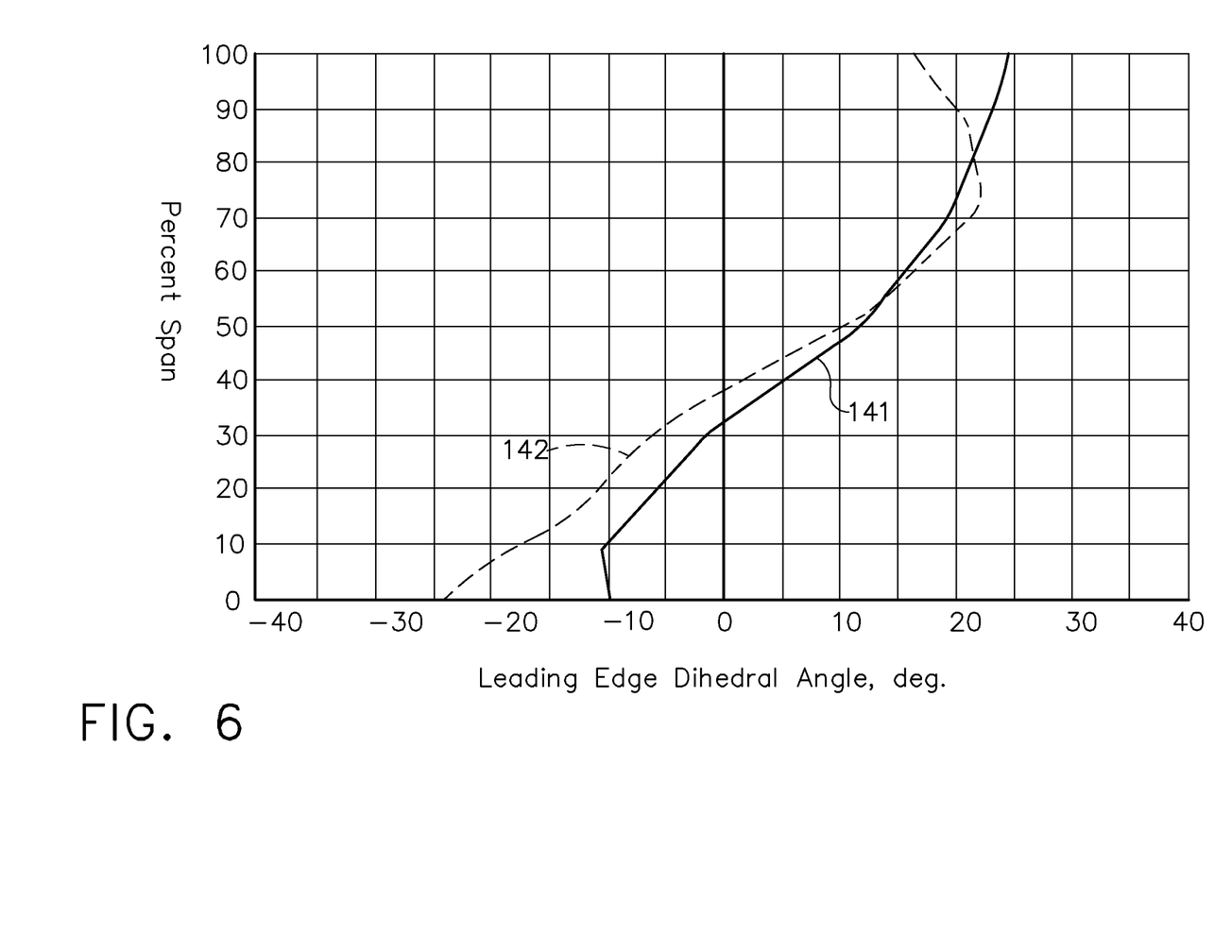
FIG. 6 is a graph plotting airfoil leading edge dihedral angle in degrees over the radial span of the airfoil of the stator vane illustrated in FIG. 1 in an exemplary embodiment.

In another aspect of the invention, the stator vane 10 may further comprise a leading edge 20 having a dihedral profile (see, for example, item 141, FIG. 6) such that the leading edge has increasing dihedral angles in the outer span region in a spanwise direction towards the tip 12. In a preferred embodiment, the stator vane 10 leading edge 20 has a dihedral angle between about −20 degrees and about +25 degrees in the midspan region 23, such as, for example, shown in FIG. 6. FIG. 6 shows an exemplary airfoil leading edge 20 dihedral profile according to one embodiment of the present invention of an stator vane 10 shown in FIG. 1 for example. In a preferred embodiment, the leading edge dihedral angle at the airfoil tip 12 is less than +25. In the context, a positive dihedral is one that would have a spanwise convex shape at the tip for the pressure side 5 of the stator vane 10. In a preferred exemplary embodiment, the outer span region 14 extends from about 90% of the span to the airfoil tip 12. See FIG. 6. In another exemplary embodiment, the stator vane 10 has a leading edge 20 having a dihedral profile (see FIG. 6) in the spanwise direction such that the leading edge has increasing dihedral angles in the inner span region 13 from the root and increasing dihedral angles in the outer span region towards the tip 12. In an exemplary embodiment of an stator vane 10 having a dihedral profile shown in FIG. 6, the airfoil has a leading edge 20 having increasing dihedral angles and decreasing normalized camber in the inner span region 13 from the root, and increasing dihedral angles and increasing normalized camber in the outer span region 14 towards the tip. In another exemplary embodiment the leading edge 20 has a negative dihedral angle at the root 11 and a positive dihedral angle at the airfoil tip 12.

FIG. 8 shows a compressor 100 for a gas turbine engine according to an aspect of the present invention. The compressor 100 has one or more rotor stages. FIG. 8 shows a compressor 100 having multiple stator stages 204, each stator stage having a plurality of stator vanes 10 spaced circumferentially around a longitudinal centerline axis 101, each stator vane 10 comprising airfoil features as described previously herein. The stator vane 10 has an inner span region 13 ("S1"), a midspan region 23 ("S2"), and an outer span region 14 ("S3") as described before. In one embodiment, in the compressor 100, at least one of the stator vanes 10 has a normalized camber profile 141 such that the normalized camber increases in the outer span region 14 in a spanwise direction towards the tip 12 and is more than 1.4 in the outer span 14 region. The compressor 100, in various other embodiments may have stator stages 204 having airfoils that have camber and dihedral features described in detail previously. In another exemplary embodiment of the compressor 100 the normalized camber in the outer span region 14 is greater than 1.4 and the normalized camber in the inner span region 13 is also greater than 1.4 wherein the first height location 41 is located at 10% span and the second height location 42 is located at 80% span from the root 11. Further, in another exemplary embodiment, the compressor 100 may have an airfoil leading edge 20 having a dihedral between about −20 degrees and about +25 degrees in the midspan region 23.

The stator vane 10 according to various embodiments of the present invention described previously herein having camber distribution profile (see item 141 in FIG. 6 for example) strengthen flow in the endwall regions of the compressor 100. The specific features of the stator vane 10 described herein increase the pressure and axial velocity levels in the critical endwall regions of the compressor 100. This in turn reduces the amount of weak flow that becomes collected near the rotor tip because of increased convection of weak flow downstream, out of the rotor passage between circumferentially adjacent blades 104 in the compressor 100. Since the accumulation of weak flow in the rotor tip passage is decreased for any given throttle setting, the stall margin of the machine is increased. In another aspect of the present invention, FIG. 8 shows a compressor 100 for a gas turbine engine. The compressor 100 has a stator stage 204 having stator vanes 10 spaced circumferentially around a longitudinal centerline axis 101. At least one of the stator stages (shown as S1, S2, etc. in FIG. 8) has stator vanes 10, having the features according to various embodiments of the present invention such as described previously herein. Analyses using known methods, such as Viscous 3-D CFD analyses, were used to compare to conventional compressors. The analyses predict over 5% improvement in throttle margin with no loss in design point efficiency. The geometry features of the stator vane 10, such as the normalized camber distribution (see FIG. 5 for example) and leading edge dihedral distribution (see FIG. 6 for example) improved the radial distribution of pressure and velocity. In one aspect of the present invention, a normalized camber distribution that is 1.0 near mid-span is used and increases as the root and tip of the stator vane are approached. The present invention enables use of relatively high normalized camber levels (greater than 1.4 for example) near the root 11 and the tip 12. Further, it is also beneficial to bound the leading edge dihedral between about −20 and about +25 degrees in the midspan region (FIG. 6), in order to produce a radial stacking distribution that further contributes to strong flow in the endwalls.

Figure 7:
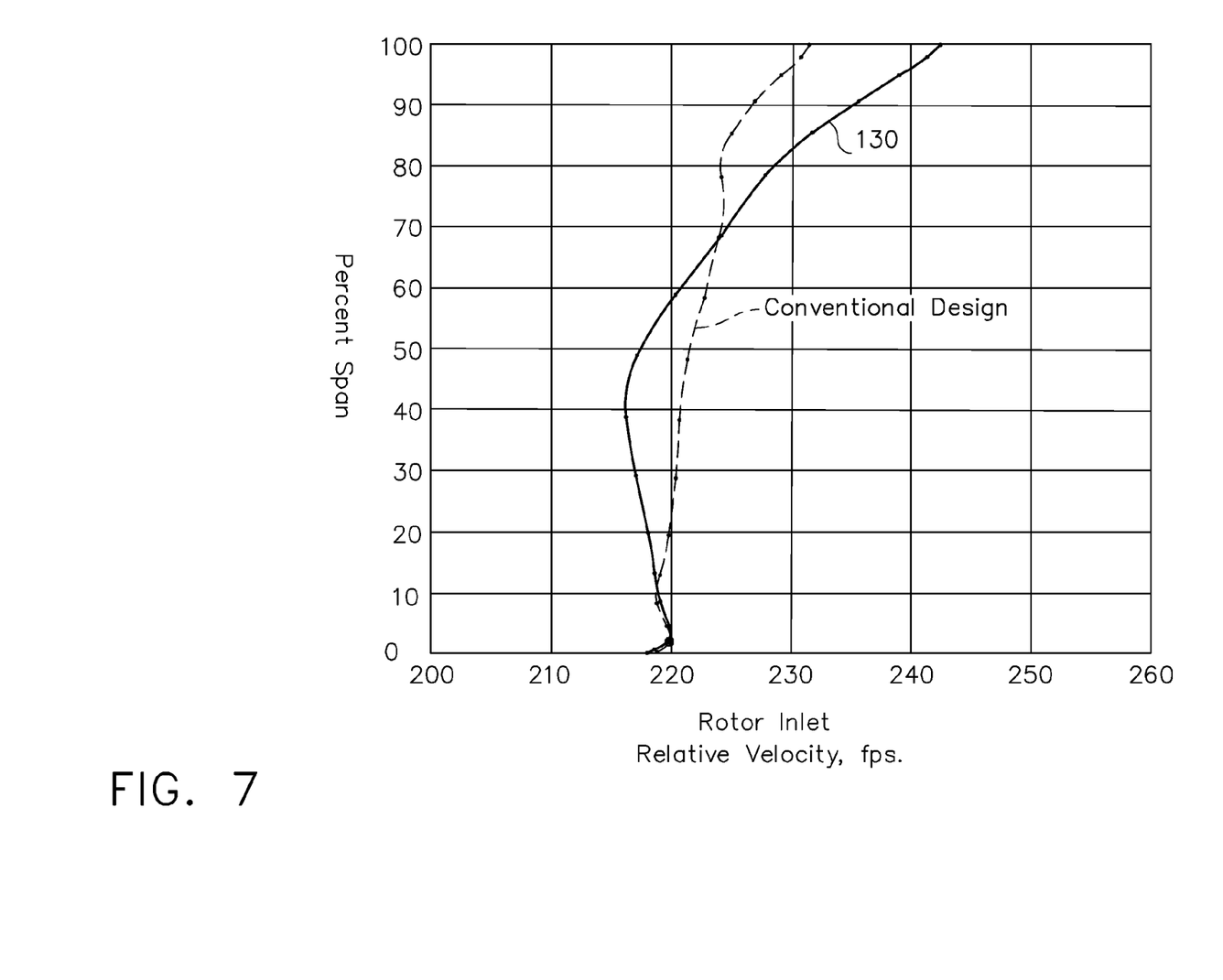
FIG. 7 is a graph plotting rotor inlet relative velocity over the radial span of the airfoil of the blade illustrated in FIG. 1 in an exemplary embodiment of a compressor.

The specific geometry features of the stator vane airfoil 10 according to the various embodiments of the present invention described previously herein create beneficial rotor inlet velocity profiles at the tip regions of the airfoils in the compressor 100. This is shown in FIG. 7. As can be seen from the rotor inlet velocity distribution shown in FIG. 7, the embodiments of the present invention, as described previously increase the rotor inlet velocity near tip of the compressor 100 as compared to conventional designs. See item 130 in FIG. 7. The improved pressure and velocity distributions of the present invention contributes to less blockage and loss near the rotor airfoil tip region, thereby extending throttle range for the compressor 100.

The various embodiments of the present invention described herein have a combination of increased end wall camber and restrictive dihedral distributions for stators that produce enhanced dynamic pressure to downstream rotors while minimizing diffusion losses. The effect is that the stators are able to sustain increased levels of both total pressure and axial velocity in the critical end wall region of the compressor. This enables the rotors to operate with strengthened flow in the rotor tip region, which in turn increases the stall margin of the compressor. The net result is no negative impact on stage efficiency, since the improvement in rotor tip efficiency offsets any increase in stator loss.

As described herein, some of the specific geometry features that describe the embodiments of the present invention include camber (the difference between leading and trailing edge metal angles) at the end walls, and dihedral (the angle between the vane and flow surface normals) at the vane leading edge (see FIGS. 5 and 6). When compared on a normalized basis to current state-of-the-art vanes, the claimed camber levels are much higher near the end walls (see FIG. 5). Various embodiments of the present invention utilize a normalized camber distribution that has a minimum value of 1.0 near mid-span, and increases to an average value that exceeds 1.4 over the inner 10% and outer 20% of span. By contrast, conventional vanes exhibit normalized camber values that cannot exceed 1.4 near the end walls. See FIG. 5. It is also beneficial to limit the leading edge dihedral to a range between −20 and +25 degrees over most of the span (see FIG. 6). When increased camber is combined with the limited dihedral at the leading edge ("A"), the resulting dihedral at the trailing edge falls out to be smaller than conventional values. However, embodiments of the present invention do not put limits on the trailing edge dihedral ("B"). See FIG. 4. These geometry features contribute to reduced aero loading at the end wall. The increased vane camber raises end wall velocities into the rotor tip region (see FIG. 7), which benefits the rotor by lowering the required diffusion. The favorable vane dihedral keeps vane diffusion losses lower, despite the increased skin friction losses at the end walls.

Analyses using known methods have shown over 5% improvement in throttle margin with no loss in design point efficiency for embodiments of the present invention described herein. In conventional compressors having conventional vanes, as the compressor is throttled towards stall, blockage accumulates near the rotor tip on the pressure surface and propagates tangentially across the rotor passage. As the entire passage width becomes blocked, the capacity of a conventional compressor having conventional vanes to produce a pressure increase is reduced, and stall may result.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A stator vane for a compressor comprising:
an airfoil root, an airfoil tip located at a spanwise distance from the airfoil root, a leading edge extending from the airfoil root to the airfoil tip, a trailing edge extending from the airfoil root to the airfoil tip, airfoil pressure and suction sides extending between the leading edge and the trailing edge; an inner span region ("S1") between the airfoil root and a first height location on the airfoil leading edge; a midspan region ("S2") between the first height location and a second height location on the airfoil leading edge located radially outward from the first height location; an outer span region ("S3") between the second height location and the airfoil tip, wherein the airfoil has a normalized camber profile such that the normalized camber increases in the outer span region in a spanwise direction towards the tip and is more than 1.4 in the outer span region; wherein the trailing edge metal angle of the stator vane decreases towards endwall regions of the compressor.

2. A stator vane according to claim 1 wherein the second height location is located at a span of about 80% from the root.

3. A stator vane according to claim 1 wherein the normalized camber in the inner span region is more than 1.4.

4. A stator vane according to claim 1 wherein the first height location is located at a span of about 10% from the root.

5. A stator vane according to claim 4 wherein the second height location is located at a span of about 80% from the root.

6. A stator vane according to claim 1 further comprising a leading edge having a dihedral profile such that the leading edge has dihedral angles between about −20 and about +25 degrees in the midspan region.

7. A stator vane according to claim 6 wherein the first height location is located at a span of about 10% from the root and the second height location is located at a span of about 90% from the root.

8. A stator vane according to claim 1 further comprising a leading edge having a dihedral profile in a spanwise direction such that the leading edge has increasing dihedral angles in both the inner span region and the outer span region.

9. A stator vane according to claim 1 wherein the leading edge has a negative dihedral angle at the root and a positive dihedral angle at the airfoil the tip.

10. A stator vane according to claim 1 further comprising a leading edge having increasing dihedral angles and decreasing normalized camber in the inner span region from the root, and increasing dihedral angles and increasing normalized camber in the outer span region towards the tip.

11. A stator vane according to claim 1 wherein the normalized camber in the outer span region is greater than 1.4 and the normalized camber in the inner span region is greater than 1.4 wherein the first height location is located at 10% span and the second height location is located at 80% span from the root.

12. A stator vane according to claim 11 wherein the leading edge has a dihedral between about −20 degrees and about +25 degrees in the midspan region.

13. A compressor for a gas turbine engine comprising:
a stator stage having a plurality of stator vanes spaced circumferentially around a longitudinal centerline axis, each stator vane having an airfoil root, an airfoil tip located at a spanwise distance from the airfoil root, a leading edge extending from the airfoil root to the airfoil tip, a trailing edge extending from the airfoil root to the airfoil tip, airfoil pressure and suction sides extending between the leading edge and the trailing edge; an inner span region ("S1") between the airfoil root and a first height location on the airfoil leading edge; a midspan region ("S2") between the first height location and a second height location on the airfoil leading edge located radially outward from the first height location; an outer span region ("S3") between the second height location and the airfoil tip; wherein at least one of the stator vanes has a normalized camber profile such that the normalized camber increases in the outer span region in a spanwise direction towards the tip and is more than 1.4 in the outer span region; wherein the trailing edge metal angle of the stator vanes decreases towards end-wall regions of the compressor.

14. A compressor according to claim 13 further comprising a leading edge having increasing dihedral angles and decreasing normalized camber in the inner span region from the root, and increasing dihedral angles and increasing normalized camber in the outer span region towards the tip.

15. A compressor according to claim 13 wherein the normalized camber in the outer span region is greater than 1.4 and the normalized camber in the inner span region is greater than 1.4 wherein the first height location is located at 10% span and the second height location is located at 80% span from the root.

16. A compressor according to claim 15 wherein the leading edge has a dihedral between about −20 degrees and about +25 degrees in the midspan region.

\* \* \* \* \*

UNITED STATES PATENT AND TRADEMARK OFFICE
CERTIFICATE OF CORRECTION

| | |
|---|---|
| PATENT NO. | : 9,074,483 B2 |
| APPLICATION NO. | : 13/072091 |
| DATED | : July 7, 2015 |
| INVENTOR(S) | : Breeze-Stringfellow et al. |

It is certified that error appears in the above-identified patent and that said Letters Patent is hereby corrected as shown below:

Claims

In Column 9, Line 13, in Claim 9, delete "airfoil the tip." and insert -- airfoil tip. --, therefor.

Page 1 of 1

Signed and Sealed this
Twelfth Day of April, 2016

Michelle K. Lee
*Director of the United States Patent and Trademark Office*